United States Patent [19]

Ager et al.

[11] Patent Number: 5,415,677
[45] Date of Patent: May 16, 1995

[54] AIR FILTERS INCLUDING FILTERS CONFIGURED FOR BOTH RADIAL AND AXIAL SEALING

[75] Inventors: David W. Ager; Edward A. Covington, both of Gastonia, N.C.

[73] Assignee: Dana Corporation, Toledo, Ohio

[21] Appl. No.: 174,295

[22] Filed: Dec. 28, 1993

[51] Int. Cl.[6] .............................................. B01D 46/00
[52] U.S. Cl. ...................................... 55/482; 55/498; 55/502; 55/510
[58] Field of Search ................... 55/482, 498, 502, 510

[56] References Cited

U.S. PATENT DOCUMENTS

| | | |
|---|---|---|
| 3,038,211 | 6/1962 | Luedi . |
| 3,395,208 | 7/1968 | Witchell . |
| 3,616,618 | 11/1971 | Gronholz et al. ...................... 55/502 |
| 3,854,888 | 12/1974 | Frietzsche et al. .................... 55/502 |
| 4,020,783 | 5/1977 | Anderson et al. ..................... 55/502 |
| 4,197,101 | 4/1980 | Cote, Jr. et al. ....................... 55/502 |
| 4,222,755 | 9/1980 | Grotto ..................................... 55/502 |
| 4,261,710 | 4/1981 | Sullivan ................................. 55/502 |
| 4,303,426 | 12/1981 | Battis ..................................... 55/502 |
| 4,443,237 | 4/1984 | Ulvestad . |
| 4,445,915 | 5/1984 | Robinson ............................... 55/502 |
| 4,720,292 | 1/1988 | Engel et al. . |
| 4,890,444 | 1/1990 | Vander Giessen et al. .......... 55/498 |
| 4,961,762 | 10/1990 | Howeth .................................. 55/502 |
| 5,082,476 | 1/1992 | Kahlbaugh et al. . |
| 5,120,337 | 6/1992 | Benzler et al. ........................ 55/482 |
| 5,160,519 | 11/1992 | Svensson et al. . |
| 5,167,683 | 12/1992 | Behrendt et al. . |

FOREIGN PATENT DOCUMENTS

| | | | |
|---|---|---|---|
| 2852385 | 1/1980 | Germany ............................... 55/502 |
| 55-159821 | 12/1980 | Japan ...................................... 55/502 |

*Primary Examiner*—Charles S. Bushey
*Attorney, Agent, or Firm*—Millen, White, Zelano, & Branigan

[57] ABSTRACT

A metal, U-shaped, annular cap is placed over one end of a cylindrical body of filter material. The metal end cap is retained on the body of filter material by a layer of plastisol and has adhered to the outside surface thereof an annular gasket made of either polyurethane or a closed or opened cell foam. The gasket presents an axially extending sealing surface for effecting a radial seal with a sealing flange in a filter housing. In accordance with another embodiment of the invention, a second annular gasket is provided which is adhered to the surface of the U-shaped end cap and extends axially therefrom. The second annular gasket has a radial surface for effecting an axial seal with a filter housing configured for axial sealing with filter elements disposed therewithin.

26 Claims, 5 Drawing Sheets

AIR FILTERS INCLUDING FILTERS CONFIGURED FOR BOTH RADIAL AND AXIAL SEALING

FIELD OF THE INVENTION

This invention relates to improvements in air filters. More particularly, this invention is directed to improvements in air filters useful for filtering air delivered to internal combustion engines.

BACKGROUND OF THE INVENTION

Heavy transportation, agricultural and construction equipment frequently rely on large diesel engines for power. It is important that clean air be delivered to these engines for combustion. Generally, one type of air cleaner for this purpose utilizes coaxial primary and secondary air filters, wherein the secondary air filter is nested within the primary air filter. Air is drawn from the atmosphere, radially through the primary and secondary filters and into the cylindrical space within the secondary filter. The filtered air then passes to the engine for mixture with fuel in the combustion chamber of the engine.

In order to ensure proper filtering of combustion air, the primary and secondary air filters are sealed within a housing by an arrangement of radial and axial sealing elements and gaskets. In one prior art approach, sealing of the filters is accomplished by compressing the outlet end of the filter against the end wall of the housing and by providing a gasket between the end of the filter and the end wall of the housing. This is accomplished by, for example, utilizing a yoke assembly which cooperates with a threaded wing nut, the nut being used to compress the filters against the end wall of the housing to prevent leakage of air around the filter elements. In the past, various other latches and clamping devices have been used to effect a positive clean air seal with such filter assemblies.

Axial compression techniques for sealing require filters and filter housings which are constructed so as not to collapse under compression. Since axially compressed filters tend to be more expensive than radially compressed filters because they are subjected to higher axial loads, radially sealed filters are being increasingly used. Since filter housings for both axially and radially sealed filter elements are on existing vehicles and equipment, confusion can occur as to which filter element should be used as a replacement when the original or prior replacement filter element is changed. Moreover, it is expensive and aggravating to produce two types of filters since the two types of filters require separation at some time during the production process and require separate marking and inventory control.

SUMMARY OF THE INVENTION

In view of the foregoing considerations, it is a feature of the instant invention to provide a new and improved end seal structure for filter elements which, among other features, allows the filter elements to be used for either axially loaded sealing or radially loaded sealing of the filter elements with housings.

The instant invention is directed to an filter improvement comprised of an annular body of filter material disposed between a pair of concentric metal screens. The annular body of filter material has radially extending first and second end faces and when supported between the screens is suitable for mounting in a housing having a bottom and a cover with an axially extending circular projection extending from the cover into the housing. A metallic end cap having a radially extending annular portion fits over the first end face of the filter element. The metallic end cap also includes an inner, axially extending portion and an outer, axially extending portion which fit over the concentric metallic screens. A layer of adhesive is disposed between the radial portion of the metallic end cap and the front end face of the filter element for bonding the metallic end cap to the filter element. A seal of polyurethane, or of either an open or closed cell foam, overlies the metallic end cap and is bonded thereto by adhesive.

In another aspect of the invention, both axial and radial sealing surfaces are provided on the end cap so that the filter improvement may be used both with housings which separate unfiltered input air streams from filtered exit airs with axial seals and with housings that separate unfiltered and filtered air streams with radial seals.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
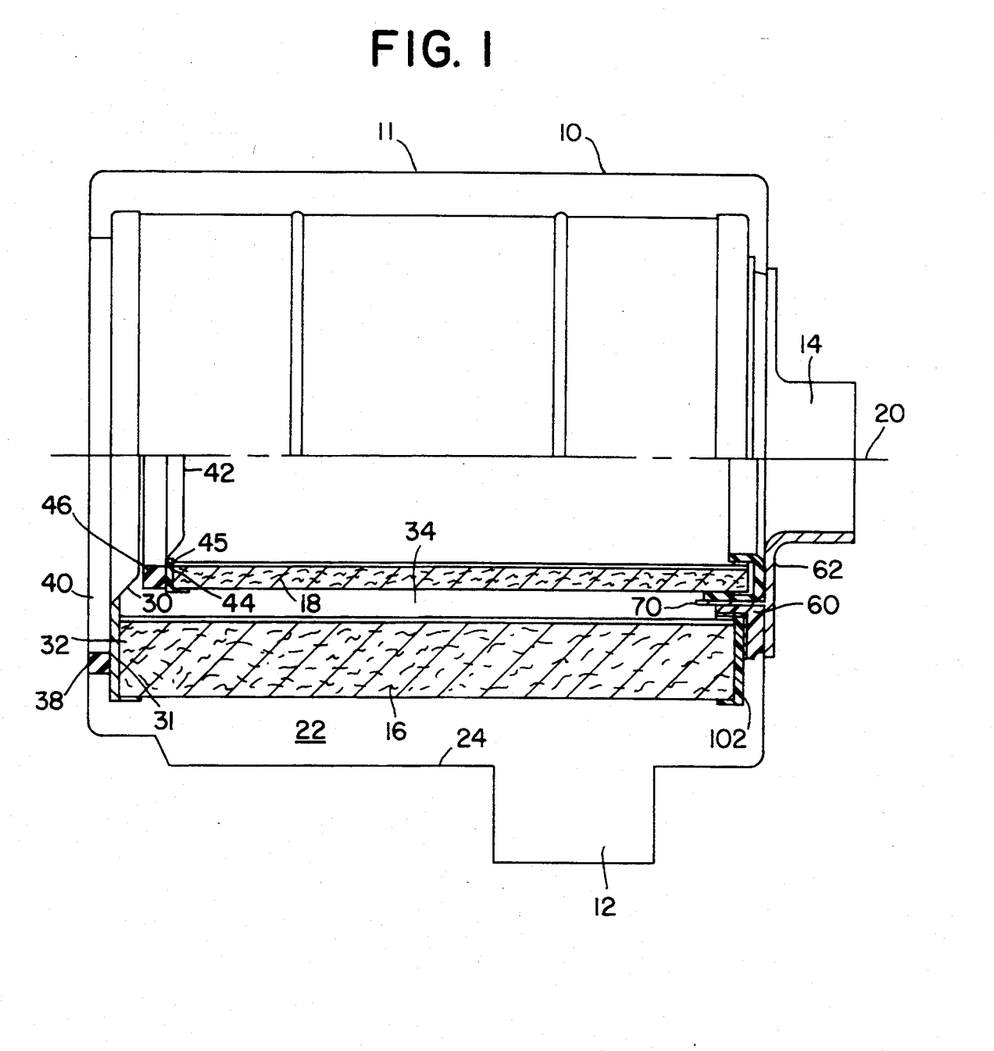
FIG. 1 is a side elevation of a filter assembly including filters configured in accordance with a first embodiment of the present invention.

Referring now to FIG. 1, there is shown a canister having a radial inlet 12 and an axial outlet 14. Within the canister 10 there is a primary air filter element 16 and a secondary air filter element 18. The primary and secondary air filter elements 16 and 18 are coaxial about an axis 20 which is aligned with the outlet 14 of the housing. The secondary filter element 18 is nested within the primary filter element 16 so that air flowing through the inlet 12 fills the space 22 between the primary filter 16 and the cylindrical wall 24 of the housing 11. The air then flows radially through the primary filter 16 and the secondary filter element 18 before flowing axially through the outlet 14.

The primary and secondary filter elements 16 and 18 perform most effectively when the air is initially filtered by the primary filter element and subsequently filtered by the secondary filter element. In order to accomplish this, the primary and secondary filter elements are radially and axially isolated from one another. This is accomplished at one end of the primary filter element 16 by having a circular end plate or pan 30 heat bonded with a layer of plastisol 31 to corrugated filter paper within the primary filter 16. The end plate 30 fits over the annular rear end 32 of the primary filter 16 and covers the annular space 34 defined by the annular filter 16 (which also contains the secondary filter 18). A resilient annular stop 38 of deformable elastic material, such as polyurethane or open or closed cell foam, is disposed between the end plate 30 and the removable end cover 40 of the housing 11 to provide a compressible spacer for the primary filter 16.

A round end plate or pan 42 is provided to close the annular rear or second end 44 of the secondary filter 18. The round end pan 42 is heat bonded to the filter 18 with a layer of plastisol 45 adhered to corrugated filter paper within the filter 18. A resilient annular stop 46 of deformable elastic material, such as polyurethane or open or closed cell foam, is positioned between inner wall of the round end pan 30 of the primary filter and the outer surface of the round end pan 42 on the secondary filter 18 to provide a compressible spacer.

The resilient annular stops 38 and 46 provide stability for the filter elements 16 and 18 in horizontal applications as well as minimizing filter element movement when the filter elements are subjected to vibration.

Figure 3:
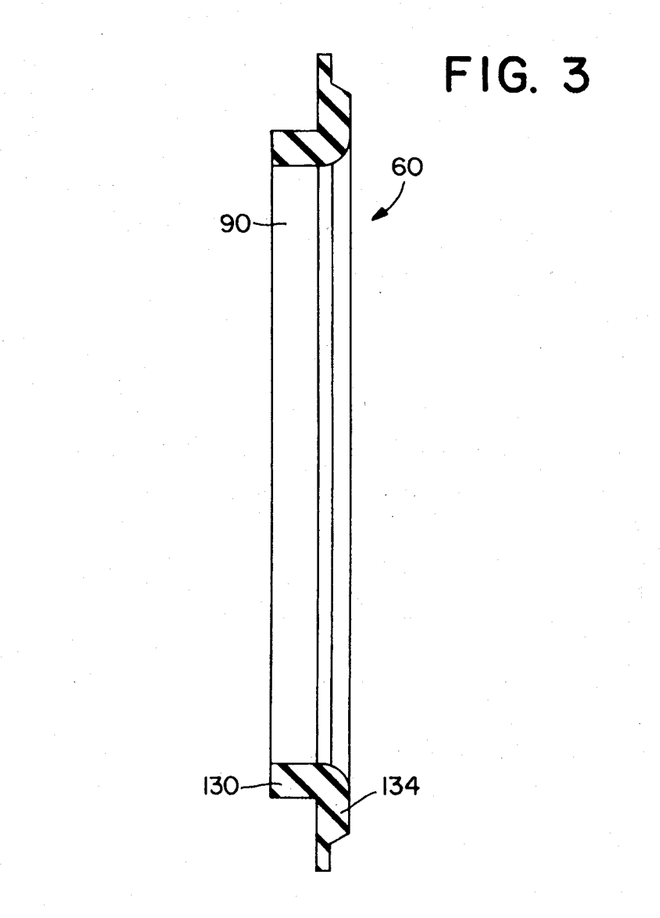
FIG. 3 is a side elevational view of a molded polyurethane or foam gasket for a primary filter element.
Figure 4:
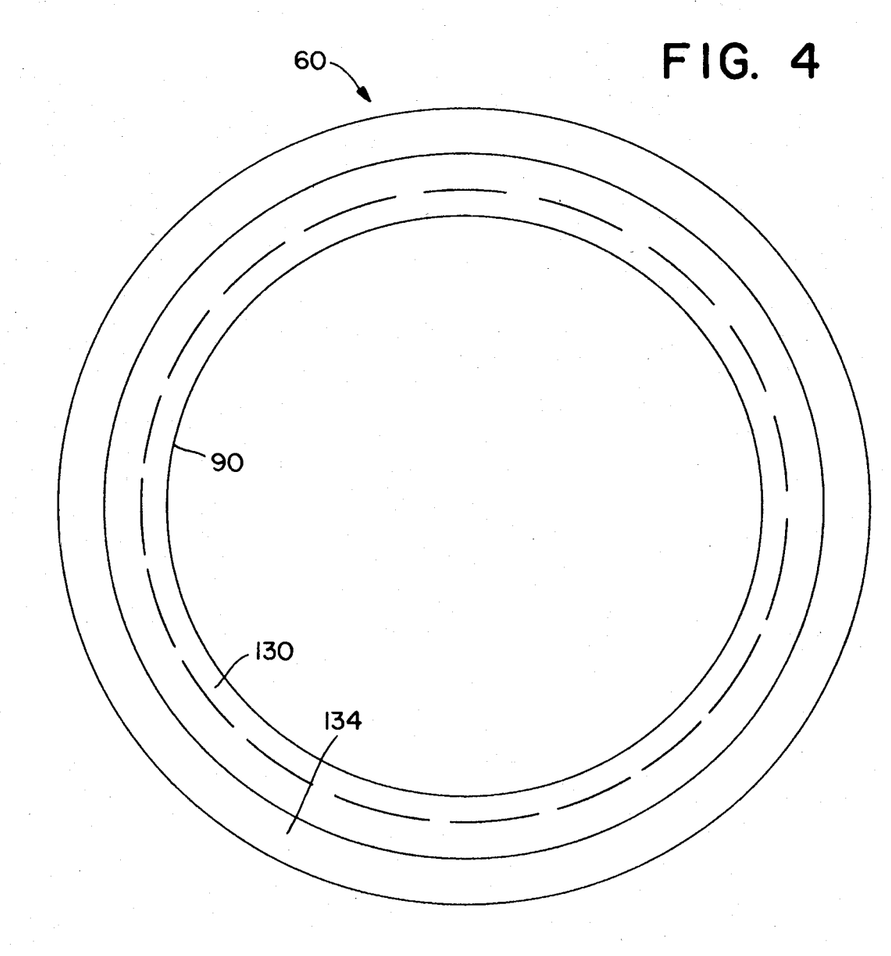
FIG. 4 is an axial or end view of the gasket of FIG. 3.

At the front or first end of both the primary filter 16 and the secondary filter 18 are disposed annular seals or gaskets 60 (see FIGS. 3 and 4) and 62 (see FIGS. 5 and 6), respectively. In accordance with the principles of the instant invention, the annular gaskets 60 and 62 are each preferably made of polyurethane but may be made of any material providing similar characteristics such as various open or closed cell foams. Gaskets 60 and 62 serve to radially position the secondary filter 18 within the primary filter 16 so as to maintain the annular space 34 between the primary and secondary filters while isolating the filters from one another. The gaskets 60 and 62 block axial movement of air from the annular space 34 to the outlet 14 so that the air, after being filtered by the primary filter 16, must flow through the secondary filter 18.

Figure 2:
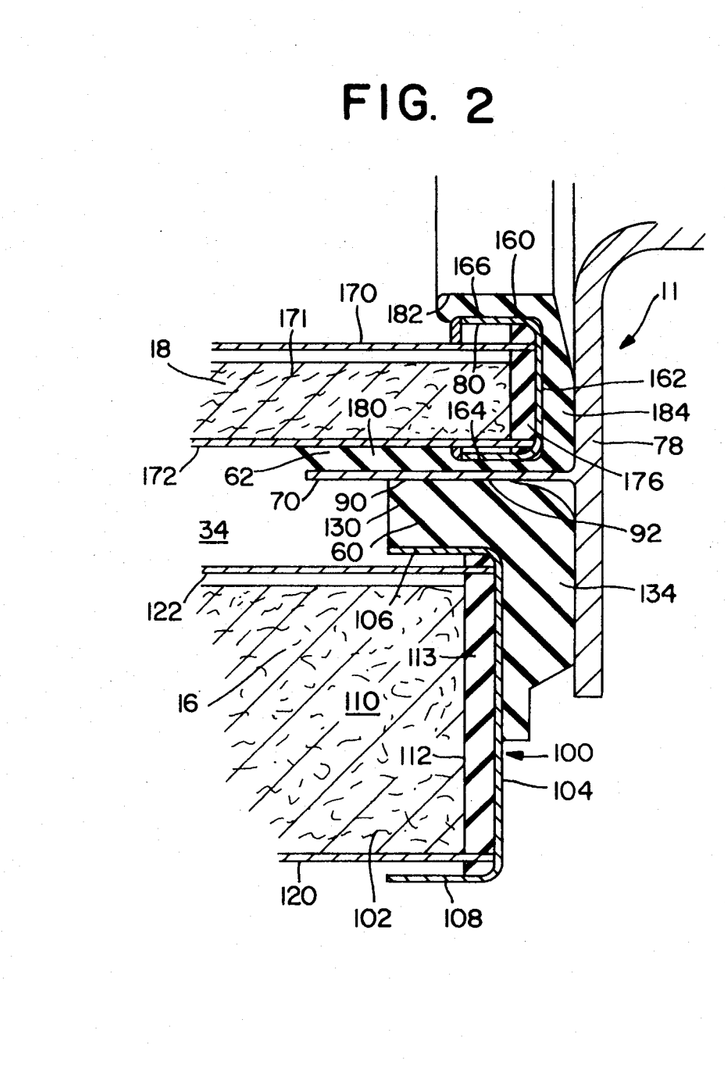
FIG. 2 is an enlarged side elevation showing a portion of one end of the filter assembly of FIG. 1.

As is seen best in FIG. 2, an annular, axially extending flange 70 projects from the front end cover 78 of the housing 11. The annular, axially extending flange 70 extends between the gasket 60 on the primary filter 16 and the gasket 62 on the secondary filter 18.

The gasket 60 has a smooth, straight cylindrical, interiorly facing surface 90 abutted by the axially extending, annular flange 70 while the gasket 62 has a smooth, straight, cylindrical, exteriorly facing surface 92 which engages the axially extending, annular flange. The surfaces 90 and 92 sandwich the annular, axially extending flange 70 therebetween. While smooth, straight surfaces 90 and 92 are illustrated, the gasket profiles may be ribbed or angled or have lower friction coefficients while providing higher point loading.

The gasket 60 is adhered to the outer surface of a stiff, annular, metal end cap 100 which is generally U-shaped in cross-section and fits over the front end 102 of the primary filter 16. Preferably, the seal 60 is bonded by a conventional adhesive to the stiff metal end cap 100. Preferably, the metal end cap 100 is made of steel but may also be made of steel which is coated with a suitable rust preventative such as paint or tin.

Since the end cap 100 is substantially U-shaped, it has a radially extending portion 104 and first and second axially extending portions 106 108, respectively. The radially extending portion 104 is bonded to a tubular filter body 110 made of corrugated paper by a layer of heat bonded plastisol 1122. The layer of plastisol 112 forms a clean straight bond with the annular end face 113 of the tubular filter body 110, rather than leaking down into the interstices between the corrugated filter paper. It has been found that the annular metal end cap 100 mechanically stabilizes the filter 16, allowing the filter to be easily inserted into the housing 11.

The tubular filter body 110 is retained between a stiff outer annular screen 120 and a stiff inner annular screen 122 disposed at inner and outer cylindrical surfaces of the tubular filter body. The outer annular screen 120 is overlaid by the axially extending portion 108 of the end cap 100, while the inner annular screen 122 is overlaid by the inner axially extending portion 106 of the end cap.

The seal 60 has a relatively thick inboard portion 130, on which the sealing surface 90 is formed, bonded to the inner axially extending portion 106 of the U-shaped (in cross-section) end cap 100. A radial portion 134, having a thickness substantially the same as the inboard portion 130, is preferably bonded to the radially extending portion 104 of the U-shaped end cap 100. However, the seal 60 could be glued at either the radial portion or the axial portion or both.

In accordance with one example, for a filter element 16 which is approximately 12.5 inches in diameter, the inboard portion 130 and radial portion 134 of the gasket 60 each have a thickness of about 0.5 inch.

The seal 62 (see also FIGS. 5 and 6) of the secondary filter 18 disposed within the primary filter 16 is also mounted on a galanealed steel, U-shaped, annular end cap—end cap 160. The U-shaped annular end cap 160 has a radially extending portion 162, an outer axially extending portion 164 and a inner axially extending portion 166. As with the primary filter 16, the secondary filter 18 has a tubular filter body 171 of corrugated paper material retained by an inner screen 170 and an outer screen 172. The inner and outer screens 170 and 172 are overlaid by the axially extending portions 166 and 164, respectively, of the end cap 160, while the radially extending portion 162 of the end cap overlies the end of the filter body and is adhered thereto by a layer of plastisol 176.

Figure 5:
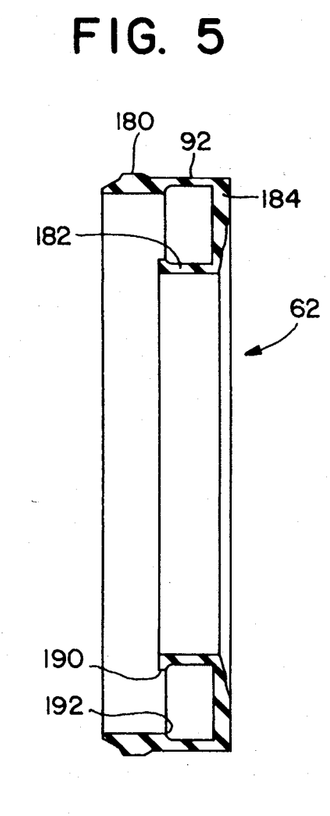
FIG. 5 is a side elevational view of a polyurethane or foam gasket for the secondary filter element.
Figure 6:
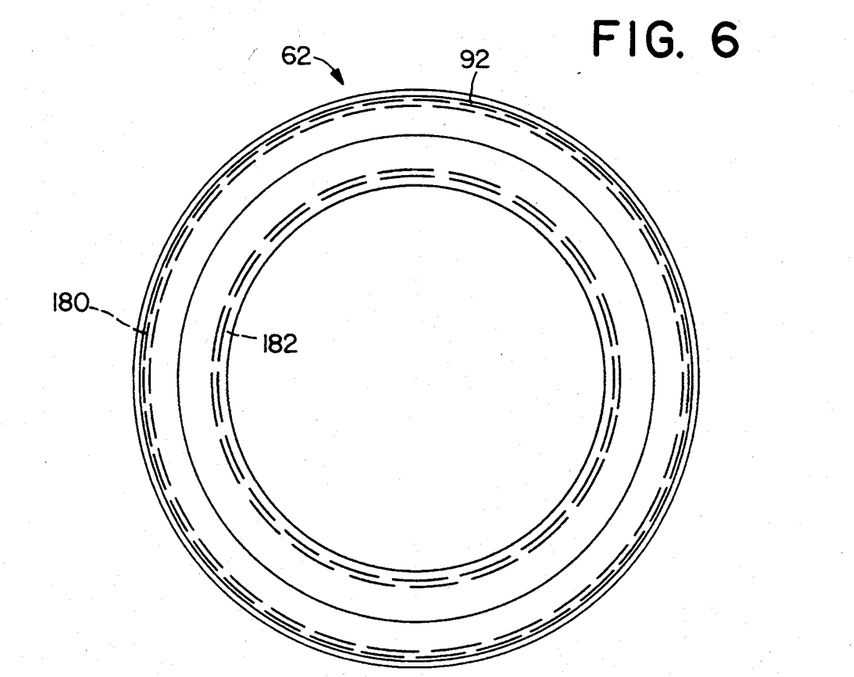
FIG. 6 is an axial or end view of the gasket of FIG. 5.

As is best seen in FIGS. 5 and 6, the seal 62 has a long, outer, axially extending portion 180 and short, inner axially extending portion 182 joined by a radially extending portion 184. Preferably, the radial portion 184 of the gasket 62 is adhered to the radially extending portion 162 of the end cap 160. The outer axial portion 180 of the gasket 62 rests against the cylindrical screen 172 and is not adhered. The axially extending portion 180 of the gasket 62 seals against the annular axially extending flange 70 projecting from the front end cover 78 of the housing 11. The radially extending portion 184 of the gasket 62 is adhered by adhesive to the radially extending portion 162 of the U-shaped annular end cap 160. The short, inner, axially extending portion 182 of the gasket 62 is mechanically locked to the inner axially extending portion 166 of the U-shaped end cap 160 so that the end cap is substantially encapsulated by the seal 62. The mechanical locking is accomplished by an inner lip 190 at the end of the inner axially extending portion 182 of the gasket 62 and an outer lip 192 found in the outer axially extending portion 180 which engage under the ends of the axially extending portion.

In accordance with one example, the seal 62 has an external diameter of about 8.28 inches and an internal diameter of about 6.13 inches. The external cylindrical portion 180 of the seal 62 has a thickness of about 0.34 inches, while the inner cylindrical portion 182 and the radially extending portion 184 have a thickness of about 0.125 inch.

Figure 7:
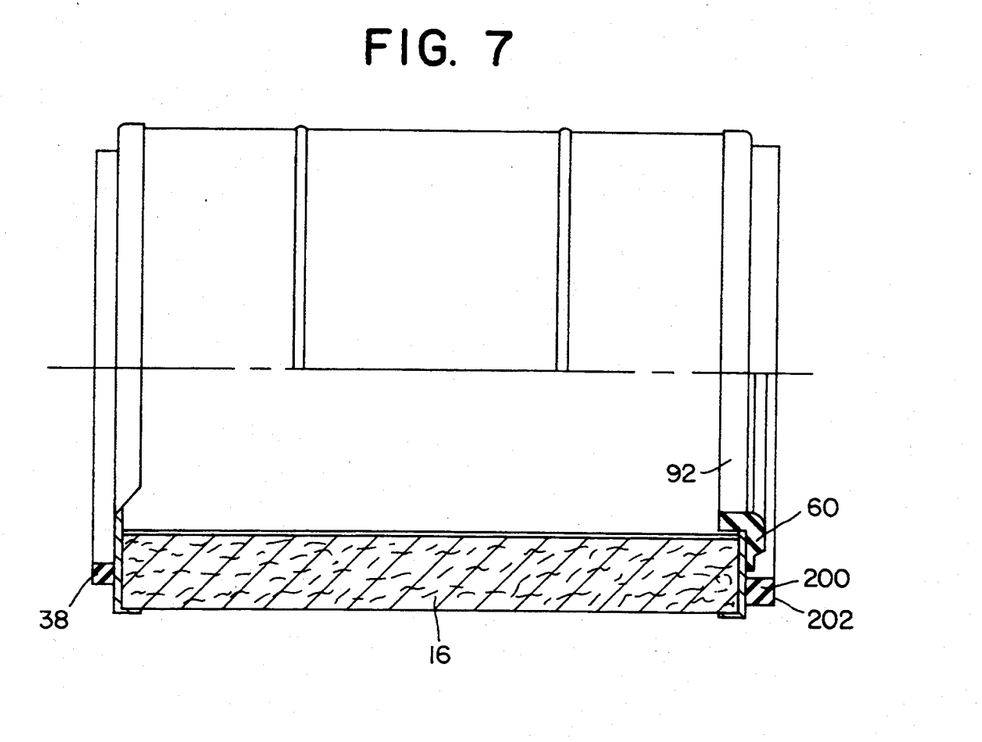
FIG. 7 is a side elevational view of a filter assembly including filter elements configured in accordance with a second embodiment of the present invention.
Figure 8:
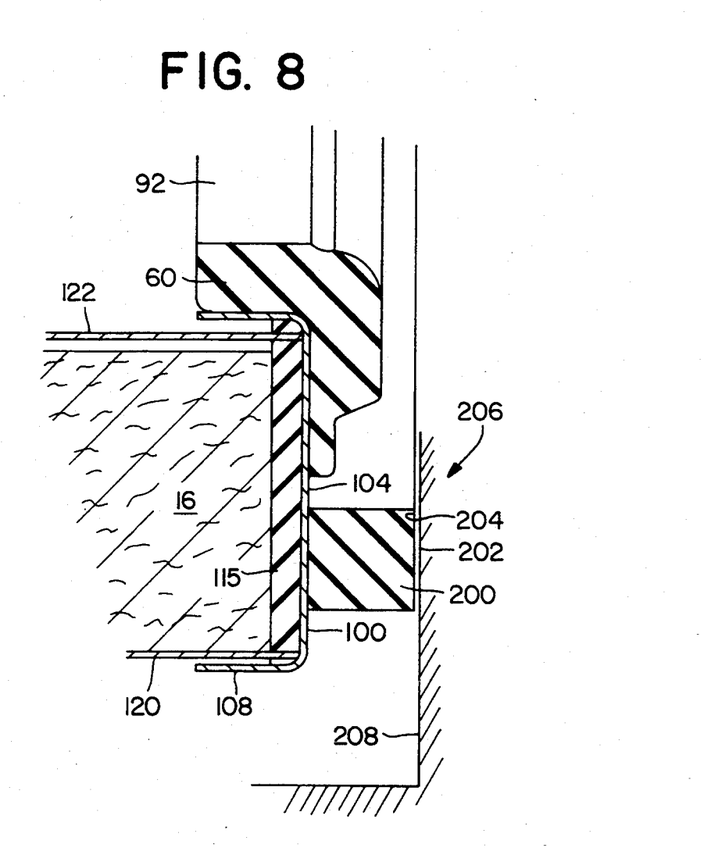
FIG. 8 is an enlarged side elevational view showing a portion of one end of the filter assembly of FIG. 7.

Referring now to FIGS. 7 and 8, there is shown another embodiment of the invention wherein the primary filter element 16 is provided with both a radial gasket 60 (see also FIGS. 3 and 4) and an axial gasket 200, the gasket 60 being a first gasket and the gasket 200 being a second gasket. The axial seal or gasket 200 is rectangular, or perhaps square, in cross-section and is adhered to a second area of the radially extending portion 104 of the end cap 100 which supports the radial sealing gasket 60. The axial gasket 200 has a radial surface 202 which abuts in sealing relationship with the inner surface 204 of an end plate 206 of a conventional filter housing represented by reference numeral 208. The filter element 16 may therefore be used with either a radially sealed housing, such as the housing of FIGS. 1 and 2 or a conventional, axially sealed housing 208. Accordingly, the cartridge 16 may be used as a replacement cartridge for either type of housing in that it provides both a radially extending, axially sealing surface 202 or an axially extending, radially sealing surface 92.

From the foregoing description, one skilled in the art can easily ascertain the essential characteristics of this invention, and without departing from the spirit and scope thereof, can make various changes and modifications of the invention to adapt it to various usages and conditions.

What is claimed:

1. In a cylindrical filter element which has a filter body of filter material that is annular in cross-section and has inner and outer surfaces retained between inner and outer cylindrical screens; the filter element having first and second ends, wherein the first end rests against a closed end of a housing adapted to retain the filter element and the second end seals against an axially extending flange disposed proximate an open end of the housing having an axial air outlet, and wherein air introduced radially in the housing passes through the filter body into a hollow core thereof and passes out of the filter through an axial opening therein, the improvement comprising:

a stiff annular end cap made of metal, being disposed over the filter body at the second end of the filter element and being adhered to the filter body, the stiff annular end cap having a first radially extending portion, a second radially extending portion extensing radially beyond the first radially extending portion and at least an inner axially extending portion;

a first annular gasket having a radially extending portion and an axially extending portion, the gasket having a mounting surface which is adhered to the stiff end cap and a radially disposed sealing surface at least on the axially extending portion thereof for sealing engagement with the axially extending flange disposed proximate the open end of the housing, the radially extending portion of the first annular gasket extending only over [a]the first portion of the radially extending portion of the stiff annular end cap; the first annular gasket being made of a relatively soft, foam[-type]material, whereby the first annular gasket isolates the inner and outer surfaces of the filter body from one another and a second annular gasket on the second portion of the stiff end cap, the second annular gasket having a radially extending end face for sealing axially with a portion of the housing proximate the open end thereof, whereby the inner and outer surfaces of the filter element may be isolated by either a radially extending, axial sealing surface or an axially extending, radial sealing surface.

2. The improvement of claim 1, wherein the jackets are made of an open cell foam.

3. The improvement of claim 1, wherein the jackets are made of a closed cell foam.

4. The improvement of claim 1, wherein the jackets are made of polyurethane.

5. The improvement of claim 1, wherein the stiff end cap is U-shaped in cross-section with an outer axially extending portion extending over the exterior cylindrical screen.

6. The improvement of claim 5, wherein the stiff end cap is adhered to the end of the filter body by a layer of plastisol.

7. The improvement of claim 5, wherein the layer of plastisol embeds end portions of the inner and outer screens.

8. The improvement of claim 1, wherein the filter element is a primary filter element which cooperates with a secondary filter element which extends within, and is coaxial with respect, to the primary filter element.

9. A cylindrical filter element for mounting in a housing having a closed end and an open end, the cylindrical filter element comprising:

a tubular body of filter material having an inner cylindrical surface and an outer cylindrical surface and a first annular end face and a second annular end face;

inner and outer stiff screens sandwiching the tubular body of filter material therebetween;

a round pan adhered to the first end of the tubular body, the round pan having a resilient annular stop for engaging with the closed end of the housing;

a stiff, U-shaped end cap adhered to the second end of the tubular body, the U-shaped end cap having first and second annular, axially extending portions and an annular radial portion, the radial portion overlying the second end of the tubular body and the axial portions overlying the inner and outer stiff screens;

at least a first annular gasket adhered to the stiff end cap, the first annular gasket having an axially extending portion with a radially facing sealing face and a radially extending portion overlying only a first section of the radial portion of the end cap, leaving a second section of the end cap uncovered by the first annular gasket, and a second annular gasket with a radially extending axially facing sealing surface; the second annular gasket being adhered to the second section of the radial portion of the end cap outboard of the first section.

10. The cylindrical filter element of claim 9, wherein the first gasket is made of polyurethane.

11. The cylindrical filter element of claim 9, wherein the first gasket is made of a resilient foam-type material.

12. The cylindrical filter element of claim 9, wherein the inner and outer screens and the stiff end cap are made of metal.

13. In a secondary cylindrical filter element for positioning with a primary filter element in a radial spaced relation thereto, which filter element has a filter body of filter material that is annular in cross-section and has interior and exterior surfaces retained between inner and outer cylindrical screens; the filter element having first and second ends, wherein the first end rests against a closed end of a housing adapted to retain the filter element and the second end seals against an axially extending flange disposed proximate an open end of the housing having an axial air outlet, and wherein air introduced radially in the housing passes through the filter body into a hollow core thereof and passes out of the filter through an axial opening therein, the improvement comprising:

a stiff annular end cap disposed over the filter body at the second end of the filter element and being adhered to the filter body, the stiff annular end cap having an exterior surface, a radially extending portion and inner and outer axially extending portions; and an annular gasket which is U-shaped in cross-section and completely overlies the exterior surface of the cap, the gasket having an outer, axially extending portion and an inner, axially extending portion; the outer, axially extending portion extending in an axial direction further than the inner axially extending portion and extending past the axially extending portion of the end cap in abutting relationship with the exterior screen, the outer axially extending portion having an axially extending sealing surface thereon for sealing in a radial direction against the axially extending flange of the housing wherein the gasket isolates the inner and outer surfaces from one another.

14. The improvement of claim 13, wherein the gasket is made of a open foam material.

15. The improvement of claim 13, wherein the gasket is made of a closed foam material.

16. The improvement of claim 13, wherein the gasket is made of polyurethane.

17. The improvement of claim 13, wherein the stiff end cap is made of metal.

18. The cylindrical filter element of claim 13, wherein the inner and outer axially extending portions of the annular gaskets have lips thereon which engage end edges of the inner and outer axially extending portions of the end cap.

19. In a cylindrical filter element which has a filter body of filter material that is annular in cross-section and has inner and outer surfaces retained between inner and outer cylindrical screens; the filter element having first and second ends, wherein the first end rests against a closed end of a housing adapted to retain the filter element and the second end seals proximate an open end of the housing having an axial air outlet with either an axially disposed flange, a radially disposed portion, or both, and wherein air introduced radially in the housing passes through the filter body into a hollow core thereof and passes out of the filter through an axial opening therein, the improvement comprising:

a stiff annular end cap disposed over the filter body at the second end of the filter element and being adhered to the filter body, the stiff annular end cap having a radially extending portion and at least an inner axially extending portion; and at least an annular gasket having a radially extending portion and an axially extending portion, the gasket having a mounting surface which is adhered to the stiff end cap and a radially disposed sealing surface on the axially extending portion thereof for sealing engagement with an axially extending flange disposed proximate the open end of the housing, and an axially disposed sealing surface on the radially extending portion of the gasket for sealing engagement with a radially extending portion of the housing proximate the open end of the housing; the annular gasket being made of a relatively soft, foam material, whereby said annular gasket isolates the inner and outer surfaces of the filter body from one another for housings which have either an axially extending flange or a radially extending portion.

20. The improvement of claim 19, wherein the gasket is made of an open cell foam.

21. The improvement of claim 19, wherein the gasket is made of a closed cell foam.

22. The improvement of claim 19, wherein the gasket is made of polyurethane.

23. The improvement of claim 19, wherein the stiff end cap is U-shaped in cross-section with an outer axially extending portion extending over the exterior cylindrical screen.

24. The improvement of claim 23, wherein the stiff end cap is adhered to the end of the filter body by a layer of plastisol.

25. The improvement of claim 24, wherein the layer of plastisol embeds end portions of the inner and outer screens.

26. The improvement of claim 19, wherein the filter element is a primary filter element adapted to cooperate with a secondary filter element disposed coaxially therewithin.

* * * * *

UNITED STATES PATENT AND TRADEMARK OFFICE
CERTIFICATE OF CORRECTION

PATENT NO. : 5,415,677
DATED : May 16, 1995
INVENTOR(S) : David W. Ager et al.

It is certified that error appears in the above-indentified patent and that said Letters Patent is hereby corrected as shown below:

```
Claim 2;   column 6, line  9;  Chnage "jackets" to --gaskets are--.
Claim 3;   column 6, line 11;  Change "jackets" to --gaskets are--.
Claim 4;   column 6, line 13;  Change "jackets" to --gaskets are--.
```

Signed and Sealed this

Thirty-first Day of October 1995

Attest:

BRUCE LEHMAN

*Attesting Officer*    Commissioner of Patents and Trademarks